2,964,517

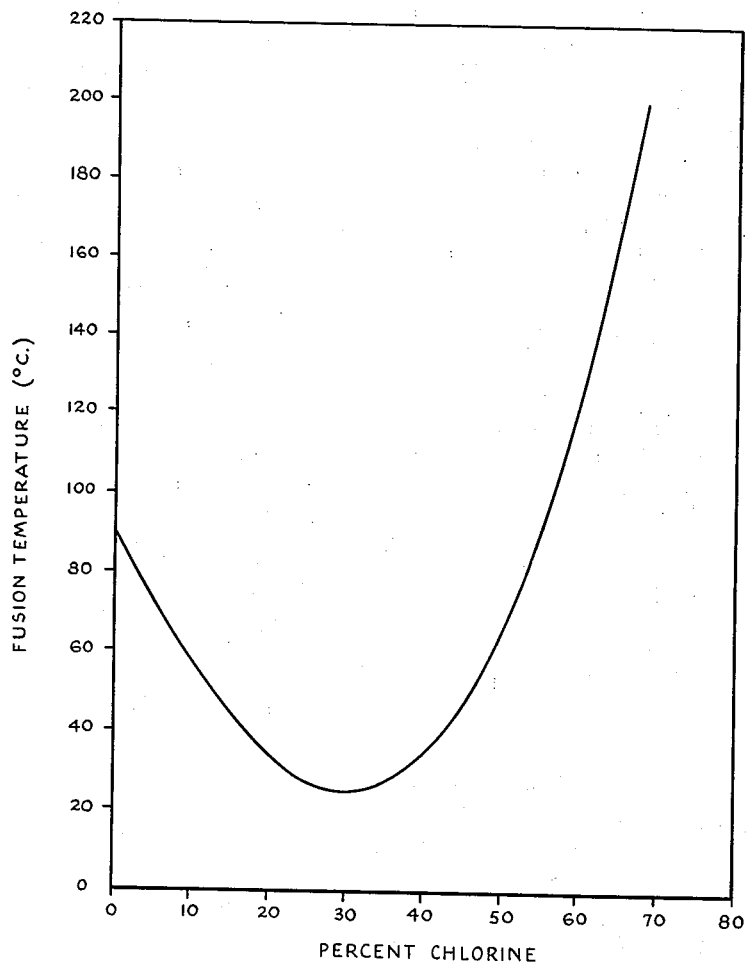
FUSION TEMPERATURES AND CHLORINE CONTENTS
OF RESINS RESULTING FROM CHLORINATION OF A
9% OXYGEN-CONTAINING OXIDIZED
POLYETHYLENE/ALKANOL TELOMER WAX

United States Patent Office 2,964,517
Patented Dec. 13, 1960

PROCESS FOR CHLORINATING OXIDIZED POLYETHYLENE WAXES AND RESINOUS OXIDIZED CHLORINATED PRODUCT

John C. Eck, Convent Station, and William C. Kraemer, Berkeley Heights, N.J., assignors to Allied Chemical Corporation, a corporation of New York Filed Oct. 25, 1957, Ser. No. 692,485

6 Claims. (Cl. 260—94.9)

This application relates to a process for chlorinating oxidized polyethylene waxes, and to the resulting resinous, oxidized, chlorinated polyethylene wax derivatives containing specific oxygen and chlorine contents.

It is known to oxidize the high melting, waxy polymers of ethylene, including the reaction product of the polymerization of ethylene in the presence of a coreactant such as a lower alkanol, especialy isopropanol, to produce waxy partial oxidation products of good emulsifiability in water as disclosed in copending application of Michael Erchak, Jr., Serial No. 515,770, filed June 15, 1955. These partial oxidation products, however, are virtually completely devoid of solubility at ordinary room temperatures in the common solvents such as toluene, xylene, the ketones, etc.

It is also known to produce chlorinated polyethylene/ alkanol telomers of enhanced solubility characteristics in solvents such as toluene, heavy naphthas, acetone, cyclohexanone, etc., adapted for use in coating and impregnating compositions, as disclosed in U.S. Patent 2,779,754 of Michael Erchak, Jr., issued January 29, 1957.

Both of the above types of derivatives of the waxy polyethylene/alkanol telomers are capable of producing coatings which, while useful for many purposes, are unsuited for certain other applications because of lack of sufficiently high solubility characteristics or of sufficient water repellency characteristics.

We have now found that synthetic resinous materials characterized by an exceptionally high degree of solubility at normal room temperatures in liquid aromatic hydrocarbons, cycloaliphatic unsaturated hydrocarbons and ketones, such solubility being significantly greater than the solubility of corresponding chlorinated unoxidized polyethylene materials of similar chlorine content, and certain of which have outstanding utility in the manufacture of coating compositions of high water repellency, the others having valuable adhesive properties, may be prepared by chlorinating the partially oxidized, hard, high melting, waxy polymers of ethylene having average molecular weights between about 600 and about 3,000, including the reaction product of ethylene and a lower alkanol, to specific degrees of oxygen and chlorine contents.

In carrying out the process according to our invention, we utilize the oxidized wax reaction product prepared according to the process described in copending application Serial No. 515,770, above referred to, which comprises subjecting normally solid, hard waxy polymers of ethylene which are saturated aliphatic compounds characterized by a recurring —CH$_2$— group, and which have average molecular weights between about 1.000 and about 3,000, especially the polyethylene/alkanol telomer waxes of this character, in the liquid phase to the action of an oxygen-containing gas to cause reaction of at least 5 pounds of oxygen per 100 pounds of wax, preferably between about 10 pounds and about 17 pounds of oxygen per 100 pounds of wax, i.e., to provide an oxidized polyethylene wax, containing at least about 3%, preferably between about 6% and about 9% of oxygen by weight, based on the weight of the oxidized wax, and acid numbers of not more than about 60, preferably between about 20 and about 50. The oxidized polyethylene/isopropanol telomer waxes prepared according to the above method are especially preferred. The expression "oxygen-containing gas" is used in its commonly accepted sense to describe a gas containing molecular oxygen.

The waxy ethylene polymers which are oxidized as above described, may themselves be formed by any suitable known method, for example by subjecting ethylene, either alone, or in the presence of a co-reactant, to temperatures between about 150° C. and about 300° C., and pressures ranging from about 500 p.s.i. to about 7000 p.s.i. They have average molecular weights between about 1,000 and about 3,000 by the Staudinger viscosity method. If a co-reactant is used, it may be, for example, a normally liquid organic compound free of olefinic unsaturation, e.g. consisting of carbon, hydrogen and oxygen, or carbon, hydrogen and halogen, for example, lower (C$_2$ to C$_4$) alkanols such as ethanol, n-propanol, isopropanol, n-butanol, secondary butanol or isobutanol, a ketone such as acetone, an ether, an alkane, an alkyl benzene, etc. When ethylene is thus polymerized in the presence of a co-reactant, for example, as disclosed in U.S. Patents 2,683,141 and 2,504,400 of Michael Erchak, Jr. a "telomer" is formed which is essentially polyethylenic and containing as a terminal addition to its polyethylene chain, a radical of the co-reactant. Such polyethylene waxes, containing an alcohol group in their structure, are referred to as polyethylene/alkanol telomers.

Utilizing the oxidized, waxy polyethylene, especially the oxidized polyethylene/alkanol telomer wax as above described, we subject it to chlorination by first preparing a dispersion in a chlorine-stable liquid medium such as carbon tetrachloride. tetrachloroethane, trichlorofluoromethane, etc. containing up to about 30 parts by weight of oxidized wax per 100 parts by weight of medium, preferably between about 5 and about 25 parts of wax. The reaction mixture is then brought to a temperature of at least about 60° C., subjected to illumination, and molecular chlorine is introduced into the dispersion while maintaining the dispersion temperature between about 50° C. and about 80° C., preferably between about 60° C. and about 70° C., until the resulting product contains between about 30% and about 70% by weight of chlorine. Such products then may contain between about 1% and about 5% of oxygen, based on the weight of the oxidized-chlorinated resinous product. The chlorination is carried out in the presence of light, which may be supplied by ordinary tungsten or fluorescent lamps etc., or by ultraviolet light sources, if desired. Free radical catalysts such as benzoyl peroxide may also be used.

While reaction, once initiated. will proceed within the temperature limits indicated above. a temperature of at least about 60° C. is usually needed to initiate the reaction, particularly when carrying out the chlorination upon relatively dilute solutions or dispersions of the wax in the reaction medium. i.e. at concentrations below about 20% by weight, since the solubility of the oxidized wax in the medium, e.g. carbon tetrachloride, is less at lower concentrations than at higher concentrations for any given temperature. As the oxidized wax is more soluble at the higher temperatures, the entire reaction is preferably maintained at the higher temperature levels of about 60° C. to about 70° C., although if desired the temperature may be reduced somewhat after the initial stages of the chlorination have passed, and may be continued for example at 50° to 60° C.

The dispersion in the chlorine-stable medium may be a solid dispersion or a solution, depending on the medium used, the temperature and the solubility of the particular oxidized polyethylene wax material in the medium. The word dispersion, as used herein, therefore refers either to the solid distributed throughout the liquid phase, or to true solutions, or to a mixture of solution and solid dispersion. After chlorination has reached a point at which the chlorinated product contains about 30% chlorine by weight or above, the reaction product is substantially completely soluble in the reaction medium.

Rate of chlorine introduction is not unduly critical. Chlorination proceeds extremely rapidly in the early stages of the reaction; for example, up to about 30% chlorine content being achieved in the first 20 minutes to half hour under optimum conditions. In these early stages, chlorine may be introduced as rapidly as reaction takes place. In the later stages, particularly after about 50% chlorination has been achieved, the reaction rate is considerably slower, and rate of chlorine introduction may be reduced. In general we find that rates between about 20 parts and about 160 parts by weight of chlorine per hour per 100 parts of oxidized polyethylene wax are satisfactory.

When the desired degree of chlorination has been accomplished, residual chlorine and hydrogen chloride may be removed, as by aspirating the solution or by blowing it with an inert gas such as nitrogen. The product may then be recovered in any suitable manner, as by evaporation of the solvent reaction medium or by precipitation of the oxidized-chlorinated resin by means of a non-solvent such as methanol.

The average molecular weights of the oxidized-chlorinated polyethylene/alkanol telomer resins of our invention range between about 1,000 and about 6,000. Starting with polyethylene waxes, such as the polyethylene/alkanol telomer waxes, having average molecular weights from about 1,000 to about 3,000 (Staudinger method), oxidation of such polyethylene waxes will often result in oxidized waxes of average molecular weights slightly less than those of the original waxes, sometimes falling as low as about 600 to about 800 at the higher degrees of oxidation, i.e., at oxygen contents of about 9% by weight. Chlorination of these oxidized waxes to the extent indicated, may then produce oxidized-chlorinated products of the same, or of considerably higher average molecular weights than the unoxidized starting waxes, for example, up to about 6,000 or higher.

The physical characteristics of the resulting products vary considerably with their chlorine content. For example the unchlorinated oxidized polyethylene starting materials are waxy solids having melting points or fusion temperatures from about 90° C. to about 105° C. depending on their oxygen contents and are virtually insoluble in the common solvents at normal room temperatures. As chlorination proceeds, the resulting chlorinated products become viscous liquids at ordinary room temperatures when the chlorine content reaches about 30%, and, at about this chlorine content, the chlorinated products become readily soluble at ordinary room temperatures, e.g. 20°–25° C., in the aromatic hydrocarbons, the ketones and the cycloaliphatic unsaturated hydrocarbons. They are also soluble in the chlorinated lower aliphatic saturated hydrocarbons, such as carbon tetrachloride etc., although virtually insoluble in the unchlorinated aliphatic saturated hydrocarbons. As more chlorine reacts, the products become resinous solids at chlorine contents from about 50 to 60%, then, above about 60% up to about 70% chlorine, the product takes the form of a white, free flowing powder (as precipitated from methanol) which fuses to a glass like solid resin on melting and subsequent solidification.

The single drawing illustrates the changing melting or fusion point characteristics of the resulting resinous products obtained by chlorinating a 9% oxygen-containing oxidized polyethylene/isopropanol telomer wax to increasing degrees of chlorination. In the drawing, chlorine contents are plotted as abscissae, against fusion temperatures as ordinates. Chlorinations of oxidized polyethylene waxes of other oxygen contents produce similar progressive changes in fusion temperatures with increasing chlorine content.

The resulting products are further characterized by a high degree of solubility in aromatic hydrocarbons, and in ketones and cycloaliphatic unsaturated hydrocarbons and chlorinated lower aliphatic hydrocarbons at normal room temperatures so as to be completely soluble therein in high concentrations, while exhibiting little or no solubility in saturated or unsaturated straight chain aliphatic hydrocarbons, or in cycloaliphatic saturated hydrocarbons.

Thus, for example, the new resinous products of our invention may be dissolved at room temperatures, i.e., about 20° C., to form solutions having resin concentrations of at least about 40 parts resin or higher per 100 parts of solvent, in carbon tetrachloride, benzene, toluene, xylene, cyclohexene, methyl cyclohexene, acetone, methyl ethyl ketone, methyl isopropyl ketone, cyclohexanone, methyl cyclohexanone or other liquid aromatic or cycloaliphatic unsaturated hydrocarbon or ketone, having a boiling point between about 50° C. and about 250° C. In the lower alkyl benzenes such as xylene etc., the new resins of our invention are substantially infinitely soluble or miscible, mixtures of said resin and solvent forming liquid solutions at concentrations up to about 150 parts by weight of resin per 100 parts by weight of xylene and then forming gels at higher concentrations of resin to solvent. For the preparation of coating compositions, solvents of the above character having boiling points between about 75° C. and about 175° C. are preferred. The resins of our invention are substantially completely insoluble in n-hexane, cyclohexane, the pentenes, 1-hexadecene and in VM & P naphtha.

Of the chlorinated-oxidized polyethylene resin products of our invention, those containing between about 55% and about 70% by weight of chlorine, and at least about 1%, preferably between about 2% and about 5%, of oxygen, deposit coatings from solvent solutions thereof which have a high degree of water-repellency when applied to masonry and brick surfaces, as disclosed in copending application Serial No. 639,285 of Burton F. B. Smith and Wilbur F. Chapman, filed February 11, 1957, and, when applied to metal, paper and other surfaces, form hard, adherent, flexible films.

The liquid resins produced at the lower stages of chlorination, e.g. from about 30% to about 50% chlorine are useful in the impregnation of cloth or paper and provide enhanced flame retardant characteristics. They are also useful in the preparation of adhesives, especially when blended with synthetic rubbery materials. We prefer to chlorinate to at least about 30% chlorine by weight, as lower degrees of chlorination do not produce products sufficiently soluble in the solvents indicated or having sufficiently different characteristics from the starting waxes to make such lower chlorination economically feasible.

Percent chlorine is readily determined by the standard fusion method as described by Mederl and Mederl in "Organic Quantitative Micro Analysis," 2nd edition, page 1665, and when referred to herein means the weight of chlorine as determined by such method, per 100 weights of product analysed. The standard method of oxygen determination consists in determinined carbon, hydrogen and chlorine, and reporting the difference as oxygen.

The following specific examples further illustrate our invention. Parts are by weight except as otherwise noted.

EXAMPLES 1–2

Two samples of a polyethylene/isopropanol telomer wax which had been oxidized so as to contain about 2.6% of oxygen were chlorinated by placing 200 parts of oxidized polyethylene/telomer wax which had a fusion temperature of about 100°–105° C., in each of two three necked flasks together with 2,000 volume parts (3190 parts by weight), of carbon tetrachloride (about 6.2% solutions), as solvent reaction medium. The reaction flasks were each illuminated with two 100 watt incandescent lamps, and gaseous chlorine was introduced into each mixture below the surface of the CCl₄ liquid at a rate of approximately 1.5 liters per minute while maintaining the temperature of the reacton medium between 68° C. and 72° C. The first sample was chlorinated to the extent of 60.1%, in 2.5 hours, the second sample was chlorinated to 67.1% chlorine in 12 hours. After chlorination was complete the solutions of chlorinated oxidized polyethylene waxes in the carbon tetrachloride were subjected to suction to reduce their volumes to 90% of their respective original volumes, thus removing residual chlorine and HCl formed in the reaction.

The carbon tetrachloride solutions of chlorinated oxidized polyethylene were then treated with cold methanol to precipitate the chlorinated oxidized wax which was removed from the liquid and tested. The products were white powders having the characteristics noted in Table I below.

TABLE I

*Chlorination of 2.6% oxygen-containing polyethylene/isopropanol telomer wax at 68°–72° C.*

| Example No. | Time, Hours | Yield, Parts | Chlorine, percent | Oxygen, percent | Fusion Temp. °C | Appearance |
|---|---|---|---|---|---|---|
| 1 | 2.5 | 453 | 60.1 | 1.1 | 115 | Slightly fused white powder. |
| 2 | 12.0 | 661 | 67.1 | 0.9 | 210 | White, free flowing powder. |

EXAMPLES 3–6

Chlorinations were carried out in the manner described in Examples 1 and 2 above, on four 200 part samples of an oxidized polyethylene/isopropanol telomer wax containing about 6% oxygen, and which had a fusion temperature of above 95° C., using carbon tetrachloride as reaction solvent in all cases except Example 4, in which trichloro-ethylene was used as solvent. There were thus produced chlorinated, oxidized polyethylene products having chlorine contents varying from 9.2% to 65.3%. The character of the products recovered as previously described, ranged from a waxy solid at the lower degree of chlorination through a viscous fluid at an intermediate degree of chlorination (about 35%) to a free flowing white powder at 65.3% chlorine. Characteristics of the products are shown in Table II below.

TABLE II

*Chlorination of 6% oxygen-containing polyethylene/isopropanal telomer wax at 68°–72° C.*

| Example No. | Time, Hours | Yield, Parts | Chlorine, percent | Oxygen, percent | Fusion Temp. °C | Appearance |
|---|---|---|---|---|---|---|
| 3 | 0.25 | 221 | 9.2 | 4.4 | 75 | Waxy Solid. |
| 4 | 3.0 | 287 | 34.7 | 4.0 | Liquid at Rm. Temp. | Viscous Fluid. |
| 5 | 2.7 | 495 | 59.2 | 2.5 | 85 | Partly fused solid. |
| 6 | 12.0 | 588 | 65.3 | 2.2 | 180 | White powder. |

EXAMPLES 7–14

Seven samples of an oxidized polyethylene/isopropanol telomer wax containing about 9% of oxygen and having an average molecular weight of about 800, penetration of about 1 to about 1.5 mm. by ASTM Method D–5–25, an acid number of about 50, a saponification number of about 50 and a fusion point of about 90°–95° C., were chlorinated by dissolving 75 parts of the wax in 1196 (750 × 1.595) parts by weight carbon tetrachloride (a 6.2% solution), in glass reaction vessels equipped with stirrer, condenser, thermometer and gas delivery tube extending beneath the surface of the liquid reaction charge. Each reaction vessel was illuminated with two 100 watt incandescent lamps. The charge was heated to about 65° C. and chlorine was introduced into the liquid reaction medium at a rate of about 1.2 liters per minute, while maintaining the temperature of the reaction mixture between about 65° and about 70°. The several samples were exposed to the action of chlorine as above described for periods varying from 33 minutes to fifteen hours. After the predetermined degrees of chlorination had been reached the reaction mixtures were subjected to vacuum to remove residual HCl and chlorine and then were poured into cold methanol with vigorous agitation, which resulted in precipitation of the chlorinated, oxidized resin. The resins were recovered from the methanol, and tested.

Those of the resulting products which contained 50% or more of chlorine were solid resin-like products. All the products had a high degree of solubility in ketones such as acetone and methyl-ethyl ketone, i.e. up to 20% or more of the wax by weight, whereas the oxidized wax product from which they were prepared is substantially devoid of solubility in ketones. Hard transparent, adherent coatings were formed on glass and steel strips when the latter were dipped into solutions of the chlorinated oxidized waxes containing 50% or more of chlorine, in acetone or methyl ethyl ketone.

A summary of the above chlorinations is given in Table III below:

TABLE III

*Chlorination of 9% oxygen-containing polyethylene/isopropanol telomer wax at 65°–70° C.*

| Example No. | Time, Hours | Yield, Parts | Chlorine, percent | Oxygen, percent | Fusion Temp. | Appearance |
|---|---|---|---|---|---|---|
| 7 | 0.33 | | 30 | 6.4 | <25 | Viscous gumlike liquid. |
| 8 | 1.0 | 112 | 51.8 | 4.5 | 70 | Partly fused Solid. |
| 9 | 2.0 | 115 | 53.0 | 4.4 | 80 | Do. |
| 10 | 3.0 | 134 | 59.8 | 3.8 | 125 | Do. |
| 11 | 4.0 | 138 | 60.2 | 3.8 | 130 | White free flowing powder. |
| 12 | 8.0 | 180 | 66.4 | 3.2 | 175 | Do. |
| 13 | 15.0 | 204 | 67.5 | 3.1 | 200 | Do. |

EXAMPLE 15

Into a 30 gallon, glass lined, steam jacketed kettle, equipped with an agitator, was placed 25 gallons (332.5 pounds) of carbon tetrachloride and 36.75 pounds of an oxidized polyethylene/isopropanol telomer wax having an average molecular weight of about 800, and containing about 9% oxygen, forming a partially dissolved dispersion of the wax in CCl₄ of about 11% concentration. The reaction mixture was brought to a temperature of 65° C. by passing it out of the kettle through a heat exchanger. From the heat exchanger the wax-CCl₄ dispersion was pumped to a glass pipe reactor irradiated with eight 48″, 40 watt blue fluorescent tubes, and chlorine gas was introduced into the dispersion to flow co-currently with the dispersion through the irradiated reaction tube, thence through a horizontally mounted pipe, to fill the pipe approximately ⅓ full, thus permitting escape and removal of hydrogen chloride evolved in the reaction. The dispersion was then returned to the kettle, and then recirculated through heat exchanger and irradiated reaction chamber while maintaining the temperature of the dispersion at 59° C. to 61° C., and continuing the recirculation with addition of chlorine for 15 hours, during which time 117 pounds of chlorine were introduced. Chlorine utilization was about 95%. After completion of the above chlorination, there remained 365 pounds of a solution containing 23% by weight of a chlorinated, oxidized, polyethylene/isopropanol telomer resin product. Upon removal of the solvent a product was obtained which contained 57.8% chlorine and 3.7% oxygen, and had a fusion point of 149° C. It was virtually completely insoluble in hexane, cyclohexane and VM & P naphtha. It was readily soluble at room temperature in xylene, acetone, cyclohexanone and cyclohexene to the extent of at least 40% by weight, and compared in solubility with a sample of a resin prepared by chlorinating an unoxidized wax of otherwise similar character to a similar chlorine content, i.e. 55% chlorine as indicated in Table IV below:

TABLE IV

*Solubilities of chlorinated-oxidized polyethylene in various solvents compared with those of chlorinated unoxidized polyethylene in similar solvents, at 72° F.*

| Solvent | Maximum Solubility—grams of solids dissolved per 100 grams of solvent | |
|---|---|---|
| | Chlorinated Unoxidized | Chlorinated Oxidized |
| Carbon tetrachloride | 18 | 35. |
| Cyclohexanone | 47.5 | 59. |
| Cyclohexene | 9.0 | greater than 52. |
| Acetone | 17.0 | greater than 40. |
| Xylene | 73.0 | greater than 155.[1] |

[1] Formed liquid solutions up to about 150 parts, gelled to solid solution at 155 parts and above, i.e. completely miscible.

The chlorinated oxidized polyethylene resins of all the foregoing examples had similar solubilities, and the products of all the examples were virtually completely insoluble in hexane, cyclohexane, VM & P naphtha (a mixture of butane, pentane, hexane, heptane, octane, etc.), the pentenes and 1-hexadecene.

While the above describes the preferred embodiments of our invention, it will be understood that departures may be made therefrom within the scope of the specification and claims.

We claim:

1. As a new composition of matter, a resin resulting from the chlorination of a hard, high melting oxidized polyethylene/$C_2$–$C_4$ alkanol telomer wax, said wax having an average molecular weight between about 600 and about 3,000, and an oxygen content between about 3% and about 9% by weight, said resin containing between about 1% and about 5% by weight of oxygen and between about 30% and about 70% by weight of chlorine, and being characterized by solubility at 72° F. in xylene of at least about 150 parts by weight of resin per 100 parts xylene, and by virtual insolubility in hexane and cyclohexane.

2. The resin according to claim 1 which contains between about 55% and about 65% of chlorine.

3. The resin according to claim 2 wherein the oxidized polyethylene wax is a polyethylene/isopropanol telomer wax containing between about 6% and about 9% of oxygen by weight.

4. The process for preparing a resinous chlorinated polyethylene derivative characterized by a high degree of solubility at 20° C. in aromatic hydrocarbons, cycloaliphatic unsaturated hydrocarbons and ketones, and by insolubility in saturated and unsaturated straight chain aliphatic hydrocarbons, which comprises dispersing in a chlorine-stable medium, in a concentration of at least about 5% by weight based on the weight of the resulting dispersion, an oxidized polyethylene/$C_2$–$C_4$ alkanol telomer wax having an average molecular weight between about 600 and about 3,000 and containing between about 3% and about 9% of oxygen by weight, and introducing chlorine into said dispersion in the presence of light at an initial temperature of at least about 60° C. and continuing said chlorine introduction while maintaining the temperature of the dispersion between about 50° C. and about 80° C. until the resulting resin contains between about 30% and about 70% chlorine.

5. The process for preparing a resinous chlorinated polyethylene derivative capable of depositing films of high water repellency from solvents therefor, which comprises dispersing in carbon tetrachloride in a concentration between about 5% and about 25% by weight based on the weight of the resulting dispersion, an oxidized polyethylene/$C_2$–$C_4$ alkanol telomer wax, having an average molecular weight between about 600 and about 3,000, and an oxygen content between about 6% and about 9% by weight, and introducing chlorine into said dispersion in the presence of light, at an initial temperature of at least about 60° C. and continuing said chlorine introduction while maintaining the temperature of the dispersion between about 50° C. and about 80° C. until the resulting resin contains between about 55% and about 70% chlorine.

6. The process according to claim 5 wherein the oxidized polyethylene/alkanol telomer wax is an oxidized polyethylene/isopropanol telomer wax.

References Cited in the file of this patent

UNITED STATES PATENTS

| 2,183,556 | Fawcett | Dec. 19, 1939 |
| 2,461,966 | Davis | Feb. 15, 1949 |
| 2,481,188 | Babayan | Sept. 6, 1949 |
| 2,779,754 | Erchak | Jan. 29, 1957 |
| 2,845,413 | Goodrich et al. | July 29, 1958 |